United States Patent
Tung et al.

(10) Patent No.: US 10,430,693 B1
(45) Date of Patent: *Oct. 1, 2019

(54) PIPING AND INSTRUMENTATION PLANNING AND MAINTENANCE SYSTEM

(71) Applicant: Accenture Global Solutions Limited, Dublin (IE)

(72) Inventors: Teresa Sheausan Tung, San Jose, CA (US); Jean-Luc Chatelain, Atlanta, GA (US); Jurgen Albert Weichenberger, Woking (GB); Ishmeet Singh Grewal, Dublin, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,362

(22) Filed: Mar. 8, 2019

Related U.S. Application Data

(63) Continuation of application No. 16/124,959, filed on Sep. 7, 2018.

(51) Int. Cl.
  *G06K 9/00* (2006.01)
  *G06K 9/62* (2006.01)
  *G06N 5/04* (2006.01)

(52) U.S. Cl.
  CPC ............. *G06K 9/6262* (2013.01); *G06N 5/04* (2013.01)

(58) Field of Classification Search
  CPC ................ G05B 15/02; G05B 19/4183; G05B 19/41865; G05B 2219/15009; G05B 2219/25068; G05B 2219/31395
  See application file for complete search history.

(56) References Cited

U.S. PATENT DOCUMENTS

| | | | |
|---|---|---|---|
| 2002/0193888 A1* | 12/2002 | Wewalaarachchi | G05B 15/02 700/9 |
| 2003/0109948 A1* | 6/2003 | Phelps | F25J 3/0423 700/97 |

(Continued)

OTHER PUBLICATIONS

Arroyo, Esteban, et al. "Automatic derivation of qualitative plant simulation models from legacy piping and instrumentation diagrams." Computers & Chemical Engineering 92 (2016): 112-132. (Year: 2016).*

(Continued)

*Primary Examiner* — Li Liu
(74) *Attorney, Agent, or Firm* — Brinks Gilson & Lione

(57) ABSTRACT

A piping and instrumentation planning and maintenance system includes an input/output (I/O) interface for receiving a target piping and instrumentation diagram (PID) from a document source system; a processor in communication with the I/O interface; and non-transitory computer readable media in communication with the processor. The non-transitory computer readable media store instruction code, which when executed by the processor, causes the processor to classify entities and properties thereof within the target PID. The entities include one or more assets and interconnections therebetween specified in the PID. The processor compares the classified entities to a knowledge base that represents relationships between a plurality of assets and interconnections between the assets. The processor then determines, based on the comparison, whether the assets in the target PID are interconnected correctly. When the assets are not interconnected correctly, the processor generates a report to identify the assets that are not interconnected correctly. The report facilitates proactive replacement or rearrangement of assets in a facility associated with the target PID.

20 Claims, 9 Drawing Sheets

(56) References Cited

U.S. PATENT DOCUMENTS

| | | | | |
|---|---|---|---|---|
| 2006/0010388 | A1* | 1/2006 | Imhof | G05B 15/02 |
| | | | | 715/734 |
| 2016/0216706 | A1* | 7/2016 | Christensen | G05B 19/41865 |
| 2018/0210428 | A1* | 7/2018 | Jundt | H04L 67/12 |
| 2018/0314222 | A1* | 11/2018 | Hoernicke | G05B 19/0426 |
| 2018/0330028 | A1* | 11/2018 | Nutt | G06F 16/83 |

OTHER PUBLICATIONS

Tan, Wei Chian, et al. "Automated design evaluation on layout of piping and instrumentation diagram using histogram of connectivity." 2016 IEEE International Conference on Automation Science and Engineering (CASE). IEEE, 2016. (Year: 2016).*

Tanaka, Satoshi, et al. "Retrieval method for an Image Database based on Topological Structure." Applications of Digital Image Processing XII. vol. 1153. International Society for Optics and Photonics, 1990. (Year: 1990).*

Walker, Vornel. "Designing a process flowsheet." Chemical Engineering Progress 5 (2009): 15-21. (Year: 2009).*

\* cited by examiner

PIPING AND INSTRUMENTATION PLANNING AND MAINTENANCE SYSTEM

RELATED APPLICATIONS

This application is a continuation under 35 U.S.C. § 120 of U.S. application Ser. No. 16/124,959, filed Sep. 7, 2018, the content of which is incorporated herein by reference in its entirety.

BACKGROUND

Field

This application generally relates to mechanical systems. In particular, this application describes a piping and instrumentation planning and maintenance system.

Description of Related Art

In the process industry, large process facilities are typically represented by a piping and instrumentation diagram (PID). The PID is a detailed diagram which shows the piping and vessels utilized in a process flow of a facility, together with the instrumentation and control devices the facility. Creation of a PID may be performed by one or more process experts with significant industry experience.

The PID for a given facility may evolve over time due to changes in the facility. Some changes to the facility (e.g., change in the model of a pump) may not be compatible with existing infrastructure of the facility. For example, the pump may not be suitable for pumping a particular fluid. Such incompatibilities may be difficult to determine as the facility evolves because people with industry knowledge of the facility may leave and/or the complexity of the facility may be too great. The incompatibility may result in a catastrophic failure of equipment at the facility.

SUMMARY

In a first aspect, a piping and instrumentation planning and maintenance system includes an input/output (I/O) interface for receiving a target piping and instrumentation diagram (PID) from a document source system; a processor in communication with the I/O interface; and non-transitory computer readable media in communication with the processor. The non-transitory computer readable media stores instruction code, which when executed by the processor, causes the processor to classify entities and properties thereof within the target PID. The entities include one or more assets and interconnections therebetween specified in the PID. The processor compares the classified entities to a knowledge base that represents relationships between a plurality of assets and interconnections between the assets. The processor then determines, based on the comparison, whether the assets in the target PID are interconnected correctly. When the assets are not interconnected correctly, the processor generates a report to identify the assets that are not interconnected correctly. The report facilitates proactive replacement or rearrangement of assets in a facility associated with the target PID.

In a second aspect, a method for planning and maintaining piping and instrumentation includes receiving a target piping and instrumentation diagram (PID) from a document source system and classifying entities and properties thereof within the target PID. The entities include one or more assets and interconnections therebetween specified in the PID. The method further includes comparing the classified entities to a knowledge base that represents relationships between a plurality of assets and interconnections between the plurality of assets. The method further includes determining, based on the comparison, whether the assets in the target PID are interconnected correctly. When the assets are not interconnected correctly, the method includes generating a report to identify the assets that are not interconnected correctly. The report facilitates proactive replacement or rearrangement of assets in a facility associated with the target PID.

In a third aspect, a non-transitory computer readable media that stores instruction code for planning and maintaining piping and instrumentation is provided. The instruction code is executable by a machine for causing the machine to receive a target piping and instrumentation diagram (PID) from a document source system; and classify entities and properties thereof within the target PID. The entities include assets and interconnections therebetween specified in the PID. The machine compares the classified entities to a knowledge base that represents relationships between a plurality of assets and interconnections between the plurality of assets; and determines, based on the comparison, whether the assets in the target PID are interconnected correctly. When the one or more assets are not interconnected correctly, the machine generates a report to identify the assets that are not interconnected correctly. The report facilitates proactive replacement or rearrangement of assets in a facility associated with the target PID.

DETAILED DESCRIPTION

The embodiments described below overcome the problems described above by providing a piping and instrumentation planning and maintenance system that maintains a knowledge base that describes the relationships between assets (e.g., pumps, valve, pipes, etc.) of a facility. The knowledge based is accessibly to a facility operator and allows the facility operator to quickly identify equipment that is compatible with existing equipment of the facility.

The knowledge base is generated by processing existing PIDs through a pipeline of models that are trained to detect various features of the PIDs and to update the knowledge base accordingly.

In some implementations, a new/proposed PID may be processed through the system and the system may flag incompatibilities in assets of the proposed PID based on information found in the knowledge graph.
}

In other implementations, the system may determine that an existing facility is operating equipment in an incorrect manner based on information in a PID that describes the facility. The system may communicate information to the facility to adjust parameters of the equipment to bring the equipment into safe operating conditions.

Figure 1:
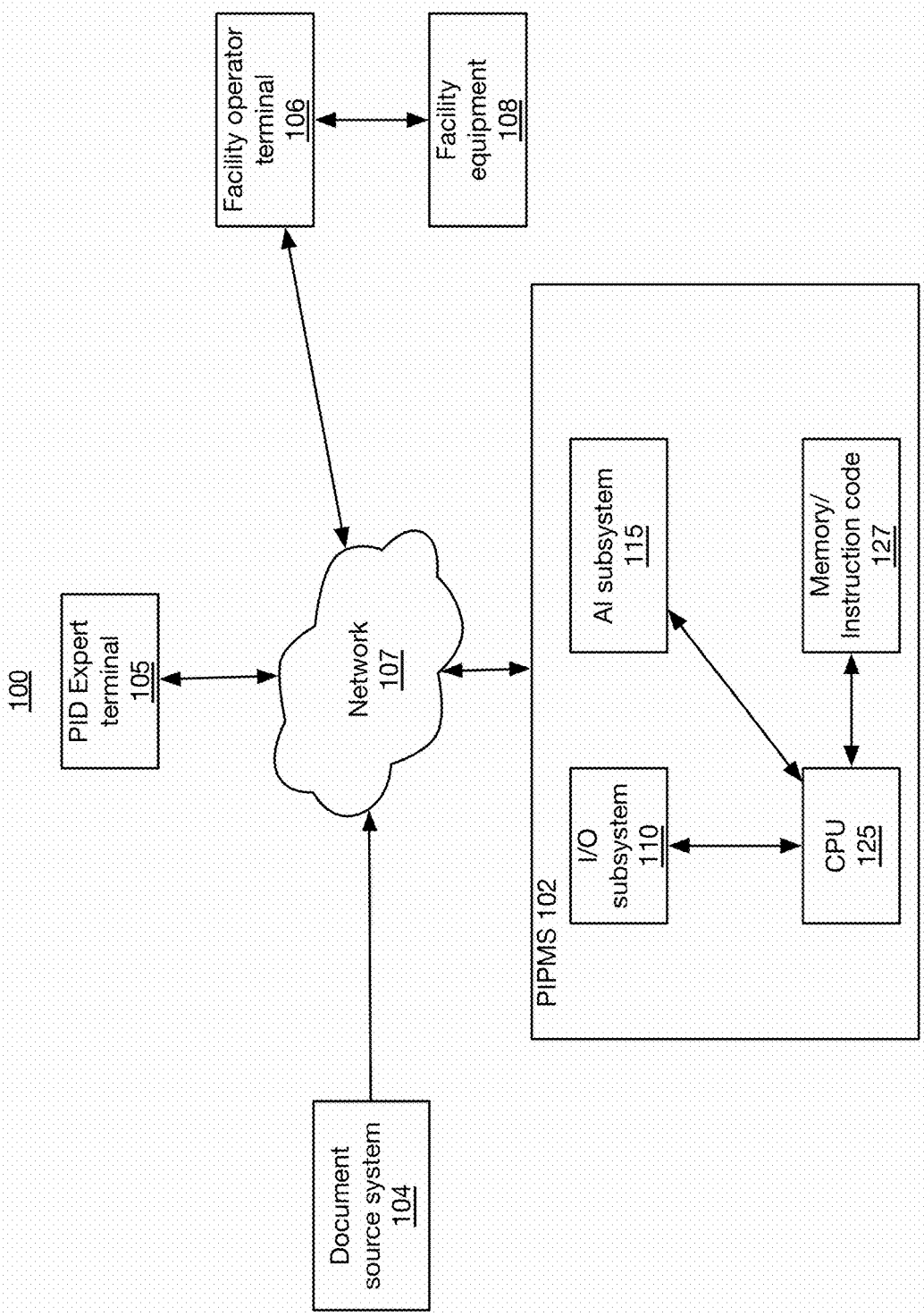
FIG. 1 illustrates an exemplary environment that includes various systems/devices that facilitate planning and maintenance of piping and instrumentation.

FIG. 1 illustrates an exemplary environment 100 in which a piping and instrumentation planning and maintenance system (PIPMS) exists. Exemplary systems/devices of the environment 100 include the PIPMS 102, a document source system 104, a PID expert terminal 105, and a facility operator terminal 106 that is in communication with facility equipment 108.

The various entities of the environment 100 may communicate with one another via a network 107, such as the Internet and may correspond to computer systems such as an Intel®, AMD®, or PowerPC® based computer system or a different computer system and can include application specific computer systems. The computer systems may include an operating system, such as Microsoft Windows®, Linux, Unix® or other operating system. The terminals may be desktop PCs and/or mobile terminals.

The document source system 104 may correspond to one or more computers that store PIDs, engineering schematics, bill of materials, specification documents, safety documents, etc. The document source system 104 may implement one or more APIs that facilitate communicating information to the PIPMS 102.

The PID expert terminal 105 may correspond to a computer at which a PID expert reviews PIDs that have been classified by the PIPMS 102. In this regard, the PID expert terminal 105 may be configured to facilitate communicating information with the PIPMS 102 via one or more APIs of the PIPMS 102.

The facility operator terminal 106 may correspond to a computer at which a facility operator can review the way in which PIDs have been classified. The facility operator terminal 106 may receive queries from the operator as to how various types of equipment/assets may be connected or used. In some implementations, the facility operator terminal 106 is in communication with facility equipment 108 that facilitates monitoring and controlling the facility equipment 108.

The document source system 104, PID expert terminal 105, and facility operator terminal 106 may be configured to communicate with the PIPMS 102 via an API such as a webserver API, a SOAP-based web service, a RESTful API, and/or a different type of API.

The PIPMS 102 may include a processor 125, input/output subsystem 110, and an AI subsystem 115. The PIPMS 102 may include other subsystems.

The I/O subsystem 110 of the PIPMS 102 facilitates communications with entities outside of the PIPMS 102. In this regard, the I/O subsystem 110 may be configured to dynamically determine the communication methodology utilized by entities of the environment 100 for communicating information to the entities using the determined communication methodology. For example, the I/O subsystem 110 may determine that a first entity utilizes a RESTful API and may, therefore, communicate with the entity using a RESTful communication methodology.

As described in more detail below, the I/O subsystem 110 may implement a web browser to facilitate generating one or more web-based interfaces or screenshots through which users of document source system 104, PID expert terminal 105, facility operator terminal 106, and/or other systems may interact with the PIPMS 102. The web browser may implement a web services interface to facilitate automating some of the web-based functionality via a computer. For example, one or more of the entities of the environment 100 may utilize the web services interfaces to access information stored by the PIPMS 102 and/or to communicate information to the PIPMS 102.

The AI subsystem 115 may correspond to hardware specifically configured to perform or assist in the performance of object detection and classification of entities of a PID. For example, the AI subsystem 115 may utilize OpenCV, a sliding window approach, predictive machine learning models, and/or other machine learning techniques to detect and classify entity of a PID.

The AI subsystem 115 may be further configured to ascertain the meaning of various documents, such as manuals, safety datasheets, etc. that may originate from the document source system 104. For example, the AI subsystem 114 may implement various natural language processing techniques such as latent Dirichlet allocation (LDA) to identify topics associated with documents, hierarchical density based cluster analysis (H-DBSCAN) to group parts of documents under one or more topics, Knuth-Morris-Pratt string searching to locate and extract occurrences of a certain words within documents, possibly linear clustering algorithms to mine text data, and/or other techniques.

The CPU 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

It is contemplated that the I/O subsystem 110, AI subsystem 115, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 2:
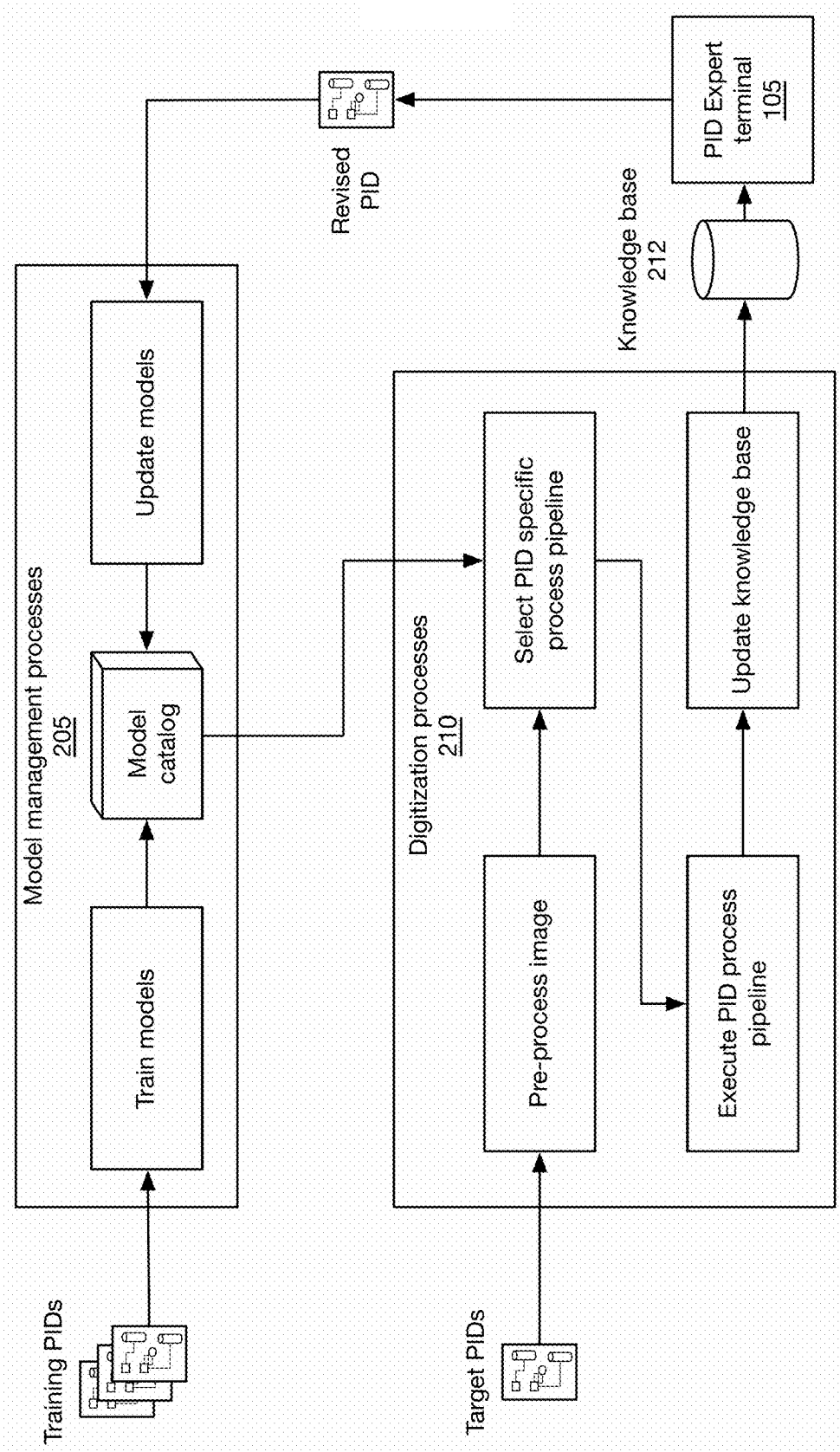
FIG. 2 illustrates exemplary processes implemented by a piping and instrumentation management system (PIPMS) of the environment.

FIG. 2 illustrates exemplary processes implemented by the PIPMS 102 that facilitate planning and maintenance of various piping and instrumentation systems. The processes generally fall under model management processes 205 and digitization processes 210. The various processes and sub-processes/operations thereof may be implemented via instruction code executed by the processor 125 of the PIPMS 102 for causing the processor to perform the processes.

The model management processes 205 generate models for identifying features of PIDs and for maintaining those models. The models generated and maintained by the model management processes 205 are stored in a model catalog. In this regard, a representative number of exemplary training PIDs (e.g., 40 PIDs) may be obtained from, for example, the document source system 104 and processed through the models. Various features of the training PIDs may have been previously determined by an expert. For example, different features such as assets, connections, and text may have been determined by the expert.

Each PID may be processed through one or more models to train the models to identify features of the training PIDs.

For example, a first model may be trained to identify asset features such as pumps, valves, regulators, etc. A second model may be trained to identify connection features between the assets such as pipes, channels, etc. A third model may be trained to identify text features surrounding assets and connections in the training PIDs such as pressure and temperature attributes, model number and manufacturer attributes, etc.

The output of each model may be reviewed by an expert with knowledge of the information in the training PIDs via, for example, the PID expert terminal 105. In this regard, the output of the model may correspond to features identified within a given training PID (e.g., assets, connections, text). The expert may review the features identified by the models and approve, reject, and/or change the features associated with the PID.

If the expert has modified the features identified for a given training PID, that PID may be reprocessed through the models to train the models further.

The digitization processes 210 correspond to a pipeline of processes that generates a knowledge base that describes assets in one or more target PIDs, the connections/relationships between those assets, and any features of the assets, based on one or more models stored in the model catalog.

At the beginning of the pipeline, a target PID is received and preprocessed. For example, the target PID may have been in paper form and may have been scanned to produce a digital image of the PID. Preprocessing may involve determining whether the scanned image quality of the target PID is suitable for subsequent processing steps. For example, preprocessing may involve determining whether the resolution of the PID image is sufficiently high, whether noise in the PID image is below a threshold, whether the contrast of the PID image is sufficiently high. In some cases, when the PID image does not meet the criteria necessary for subsequent processing steps, an operator may be notified that the PID image has to be rescanned. In other cases, the PIPMS 102 may attempt to automatically remedy the issues. For example, the resolution and/or contrast level of the PID image may be adjusted to facilitate subsequent processing steps. Image filtering techniques such as noise filtering, etc. may be applied to the image to remove artifacts from the PID image that would otherwise impede subsequent processing steps.

After the PID image has been appropriately processed, a specific PID processing pipeline may be selected and applied to the PID image. In this regard, specific PID processing pipelines may have been previously specified by an expert with knowledge of the information contained in a given type of PID via, for example, the PID expert terminal 105.

Figure 3:
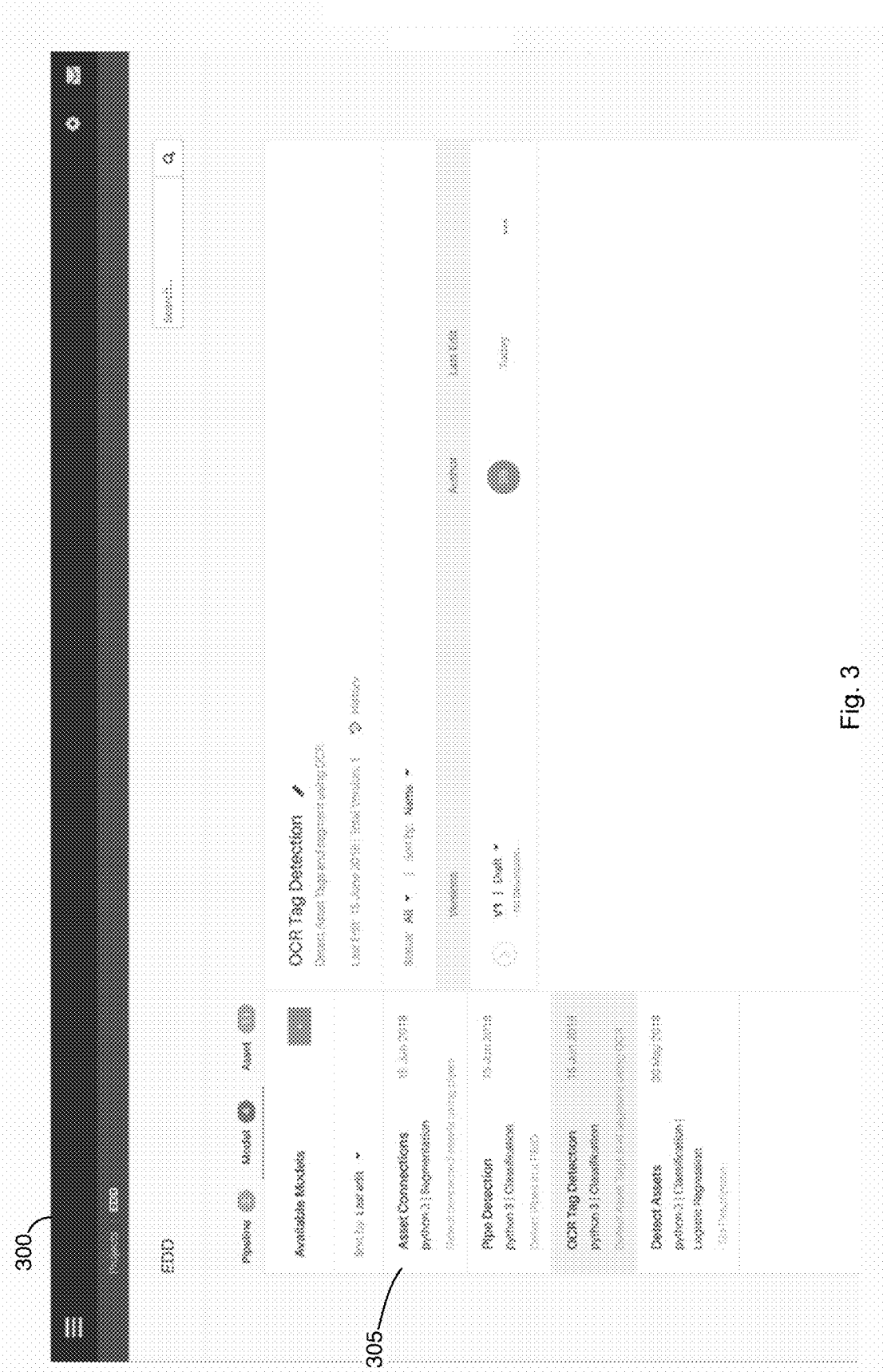
FIGS. 3-5, and 7 illustrate various screenshots of a user interface generated by the PIPMS.
Figure 4:
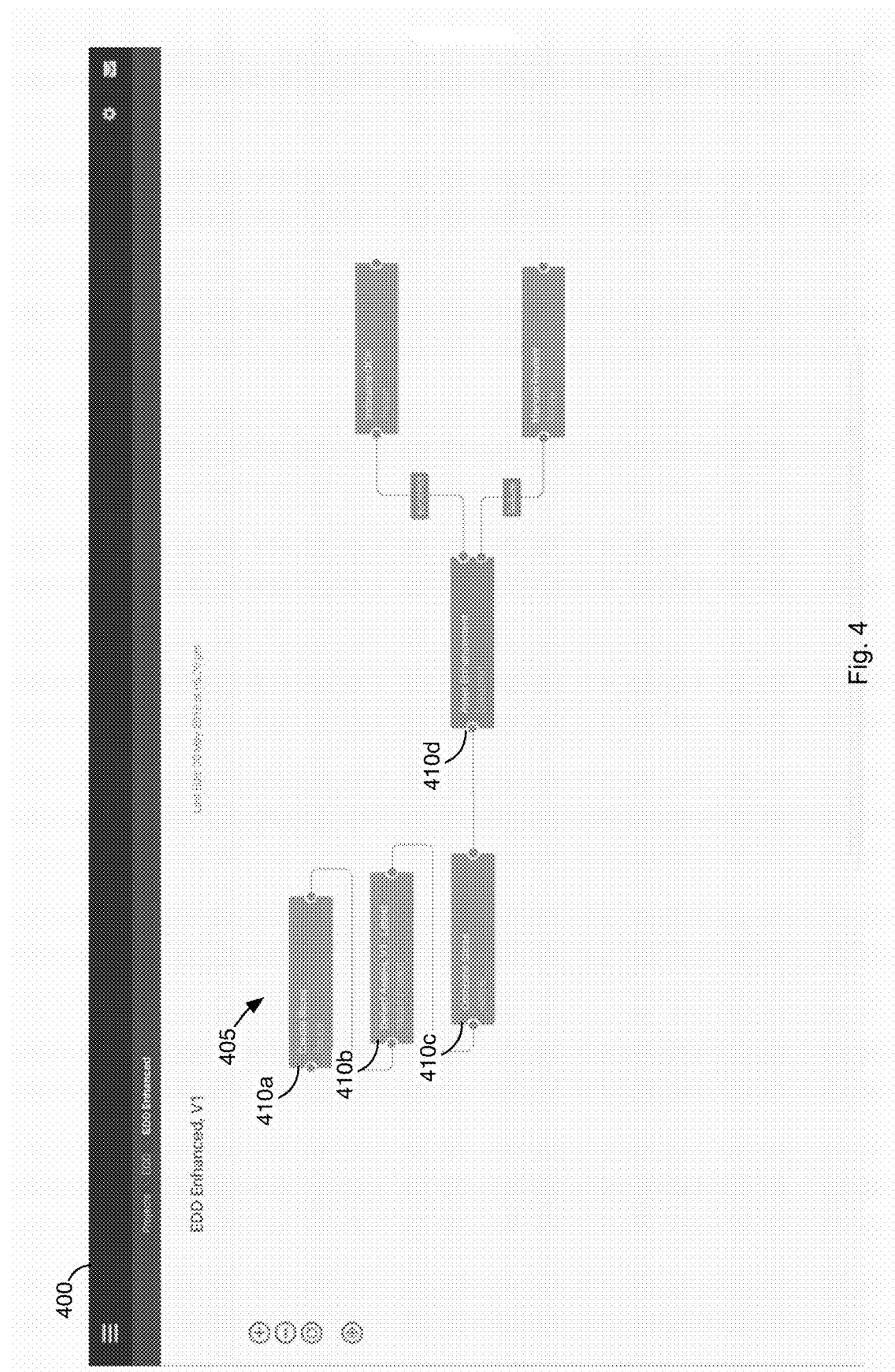

FIGS. 3 and 4 illustrate various user interfaces generated by the PIPMS 102 that facilitate creating specific PID processing pipelines for different types of PIDs.

Referring to FIG. 3, a user interface 300 may be presented to the expert that facilitates selection of models 305 that are available in the asset catalog. Exemplary models 305 that may be selected include, for example, models for detecting assets, asset connections, pipes, and text in PIDs.

Referring to FIG. 4, the operator may connect the models together to form a process pipeline 405 capable of classifying a PID. For example, the expert may drag and drop a "create slices" process 410*a*, "detect assets" model 410*b*, "asset enhancement" model 410*d*, and a "combined slices" process 410*c* into the workspace of the user interface. The "create slices" process 410*a* may be configured to segment a PID image of a given size into a number of smaller sized images. Segmentation may be required when the PID image is too large to process by subsequent models or subprocesses.

Figure 5:
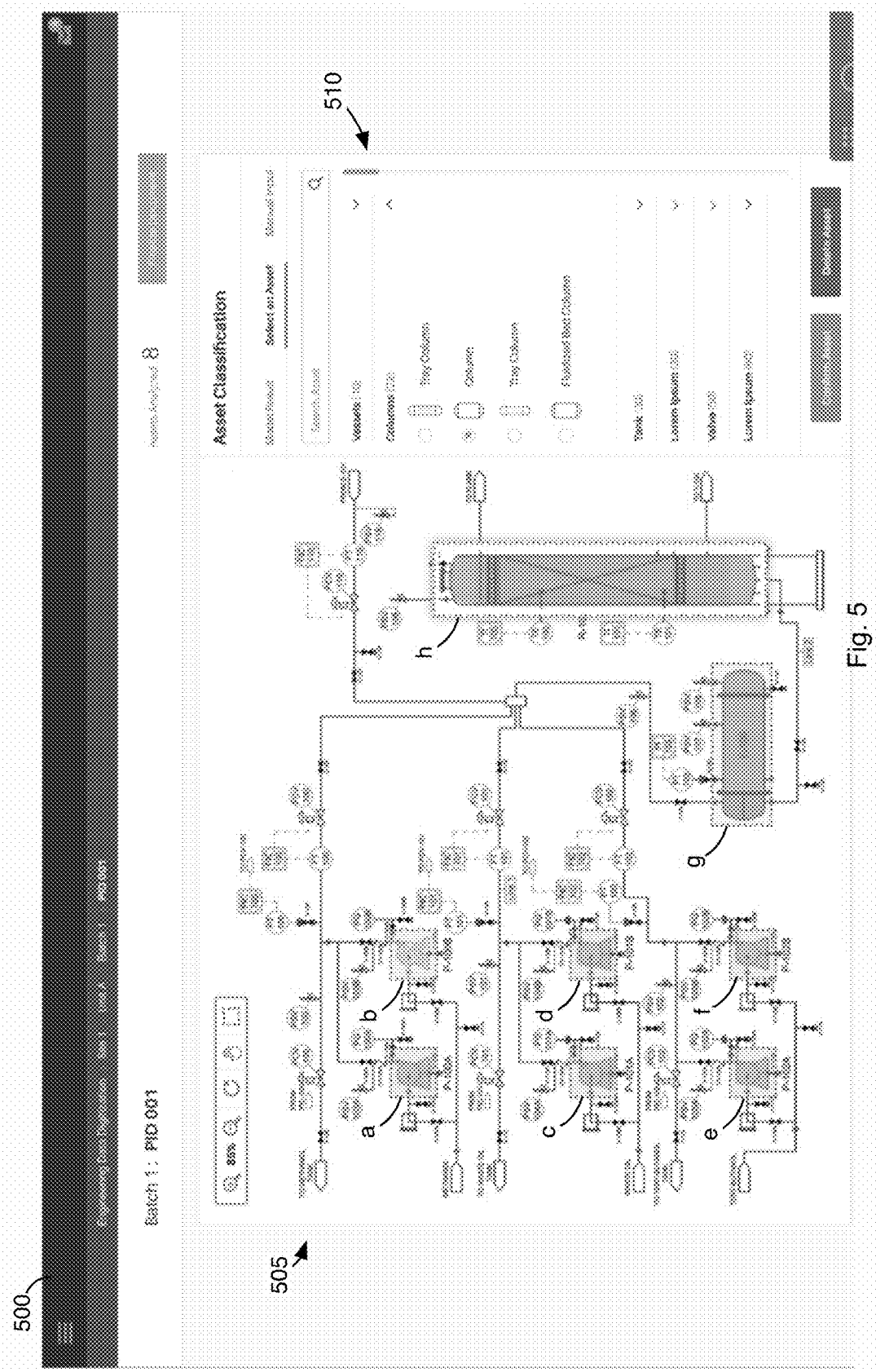

The "detect assets" model 410*b* is configured to identify different portions of the PID image that correspond to assets (i.e., valves, pumps, pipes, etc.). For example, as illustrated in FIG. 5, some of the regions that may be detected by the "detect assets" model 410*b* as corresponding to assets may include regions a-h.

The "asset enhancement" model 410*d* is configured to identify text and the meaning of the text in the PID image that is near assets detected by the "detect assets" model 410*b*. For example, the "asset enhancement" model 410*d* may detect text near an image of a pump and determine that the text corresponds to, for example, a pump model number, fluid pressures, fluid temperatures, flow rates, etc.

The "combined slices" process 410*c* is utilized in combination with the "create slices" process 410*a* to recombine the output produced by a given model. For example, in the illustrated case, the "detect assets" model 410*b* processed different segments of the PID image because the PID image itself was too large to process. The output of the "detect assets" model 410*b* is, therefore, based on individual segments. The "combine slices" process 410*c* combines the output from the model that is associated with the different segments. In some cases, the segments of the PID may overlap to some extent. That is, the same asset may appear in adjacent image segments and, therefore, appear as duplicates in the output of the "detect assets" model 410*b*. The "combined slices" process 410*c* may remove any duplicates when combing the "detect assets" model 410*b* output results for the different image segments.

In some cases, different process flows may be generated for different types of PIDs. In this regard, the type of PID may be checked initially, and the appropriate process flow for classifying information in the PID may be selected and utilized to process the PID. In some implementation, determination of the type of PID document may be based on, for example, metadata within the PID. In other implementations, an expert may determine the PID type and select the appropriate process flow for classifying the PID.

Referring back to FIG. 2, after selection of the specific PID processing pipeline, the PIPMS 102 may execute the PID processing pipeline against the target PID. After processing the target PID, the PIPMS 102 may generate the user interface 500 of FIG. 5.

Referring to FIG. 5, the user interface 500 may include an image of the target PID 505 or section of the target PID. The user interface 500 may also include a selection dialog 510 that facilitates selection of one or more assets displayed in the image 505. Upon selection of an assets in the selection dialog 510, the user interface 500 may be updated to highlight assets corresponding to the selection, as illustrated by the highlighted regions a-h.

In some implementations, the user interface 500 is configured to allow an expert to specify whether the target PID was correctly classified. In this regard, the user interface 500 may be configured to allow the expert to modify the classification given to an asset. For example, a particular asset may have been classified as a valve when in fact it corresponds to a pump. Where reclassification of a target PID is required, the reclassified PID may be sent back to the model management processes 205 to retrain one or more of the models.

If the classification of the PID is determined to be correct, the knowledge base may be updated to describe assets in the target PID, the connections/relationship between those assets, and any features of the assets.

Figure 6:
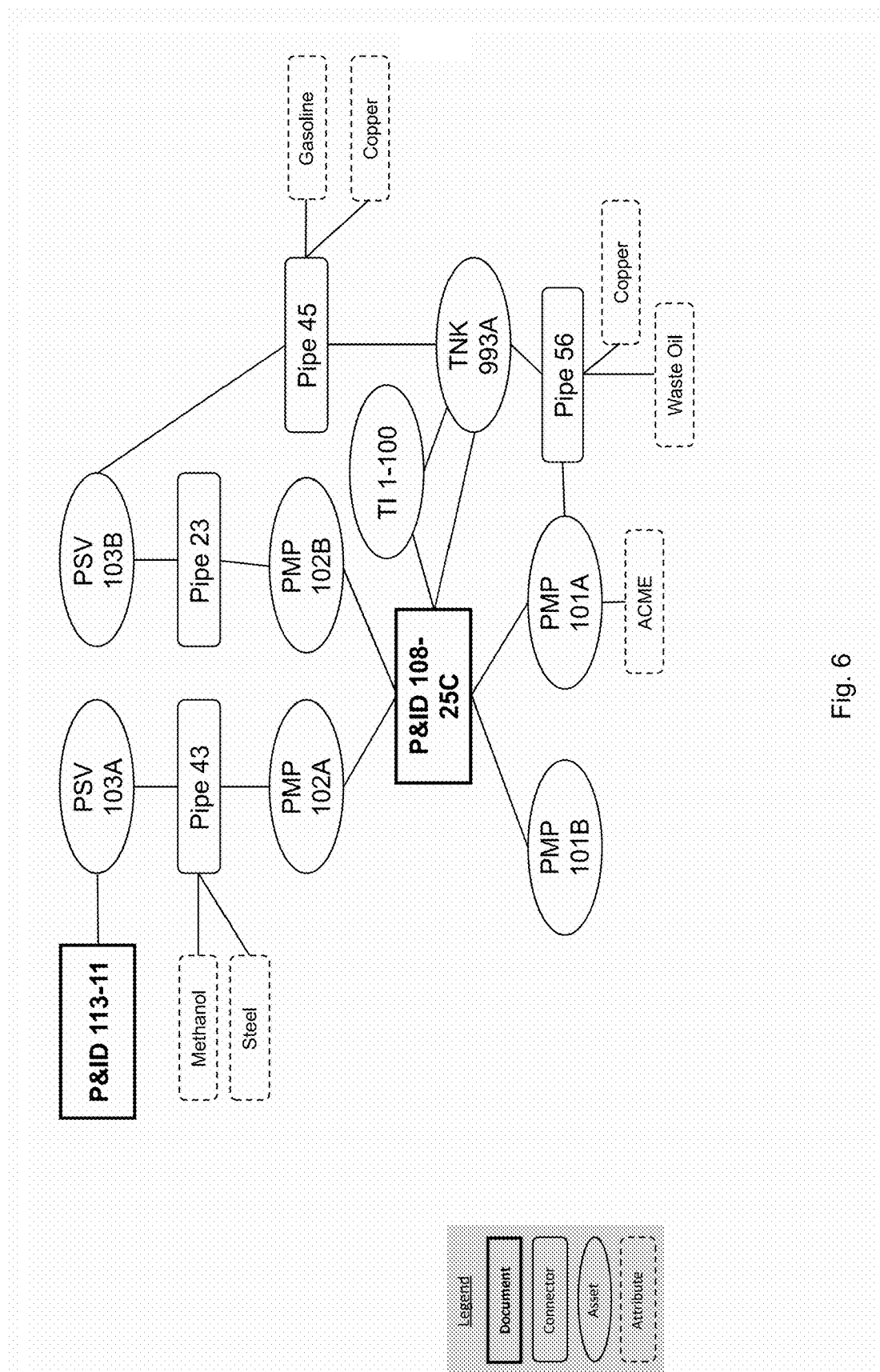
FIG. 6 illustrates an exemplary knowledge base generated by the PIPMS.

An exemplary knowledge base that may be generated is illustrated in FIG. 6. Referring to the key in FIG. 6, the exemplary knowledge base corresponds to an ontology that includes document, asset, connector, and attribute nodes.

The document nodes include information that identifies a particular PID where information was extracted from. All assets found in that PID may be connected to this node.

Asset nodes correspond to assets extracted from the PID (e.g., pumps, valves, pipes, etc.). The asset nodes may be linked to documents related to the asset (e.g., manuals, technical bulletins, etc.) as well as other assets via connector nodes. In this regard, the documents may have been processed via the AI subsystem 115 to identify documents relevant to the various assets. The knowledge base may have been upgraded by the AI subsystem 115 accordingly.

The connector nodes are similar to edges but contain additional information. For example, in this case, the connector nodes correspond to pipes that have liquid flowing through them. The connector nodes are connected to different assets such as a pump to a tank through a valve.

Attribute nodes augment information about the PID, assets, and connectors. Attribute nodes specify information that Includes metadata information such as piping material, a type of liquid flowing through an asset, manufacturer information of an asset, service history of the asset, etc. In some cases, attribute nodes may be added to the knowledge base by processes other than the digitization processes.

In some implementations, a large number (e.g., hundreds) of target PIDs that have already been scanned into a digital form may be processed through the digitization processes 210. The target PIDs may be processed sequentially or in parallel.

Metadata in each target PID may be analyzed to determine the type of PID. The detected type may be used to select an appropriate PID processing pipeline to apply to a given PID. The knowledge base 212 may be automatically updated with information that describes a given target PID. That is the knowledge base 212 may be updated without first requiring expert review of the way in which a given target PID was classified.

Figure 7:
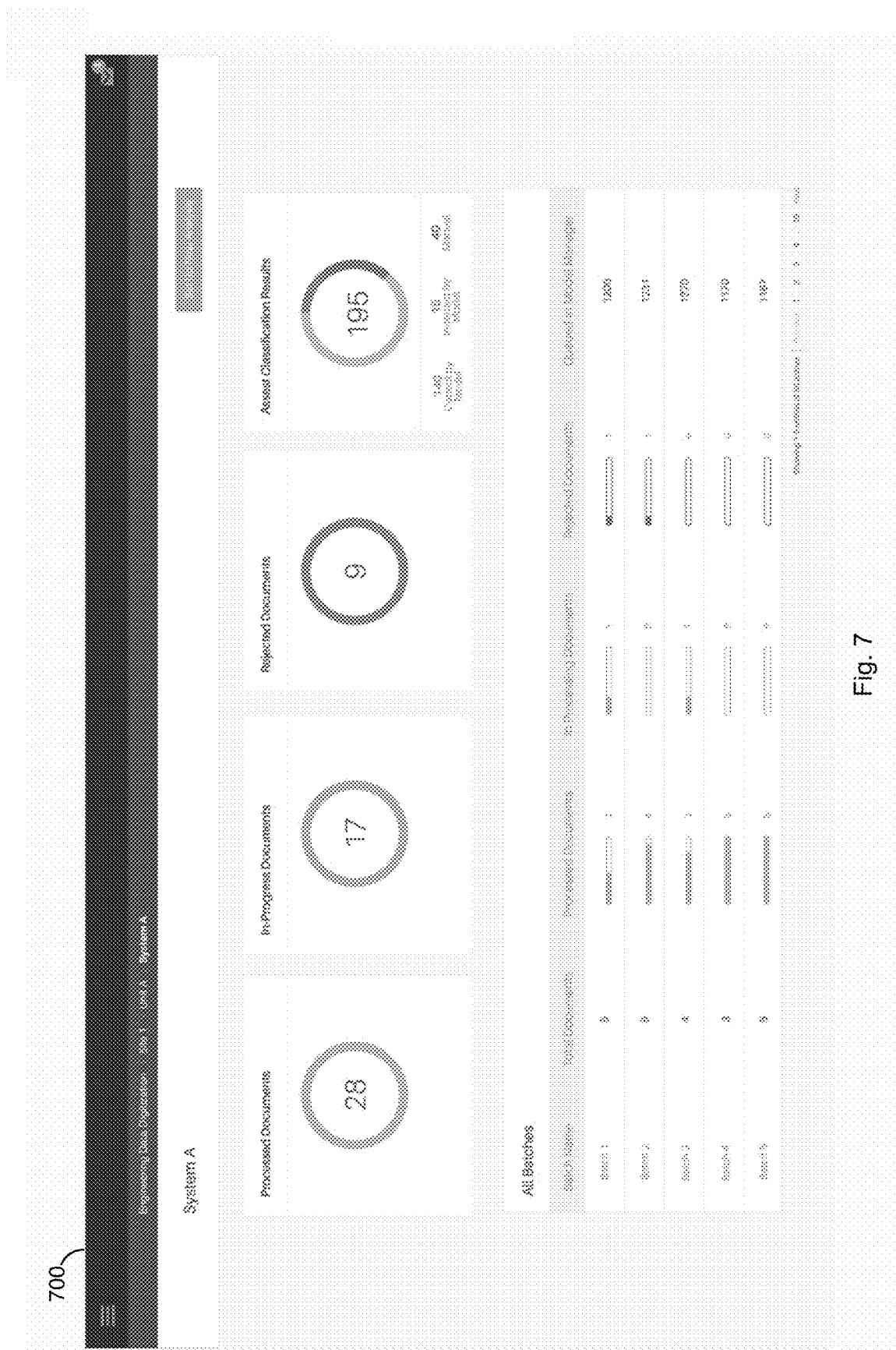

FIG. 7 illustrates an exemplary user interface 700 that may be generated by the PIPMS 102 to show the status of the digitization processes 210. Referring to FIG. 7, the user interface 700 may display the number of documents that have been processed (e.g., 28), the number of PIDs currently being processed (e.g., 17), and the number of rejected PIDs (e.g., 9). Rejected PIDs may be routed to an appropriate to an expert for further analysis.

As noted above, the knowledge base 212 is updated with information that describes assets and the interconnections therebetween in target PIDs that are processed through the digitization processes 210. Therefore, with each new target PID, the knowledge base 212 grows or is enhanced.

Figure 8:
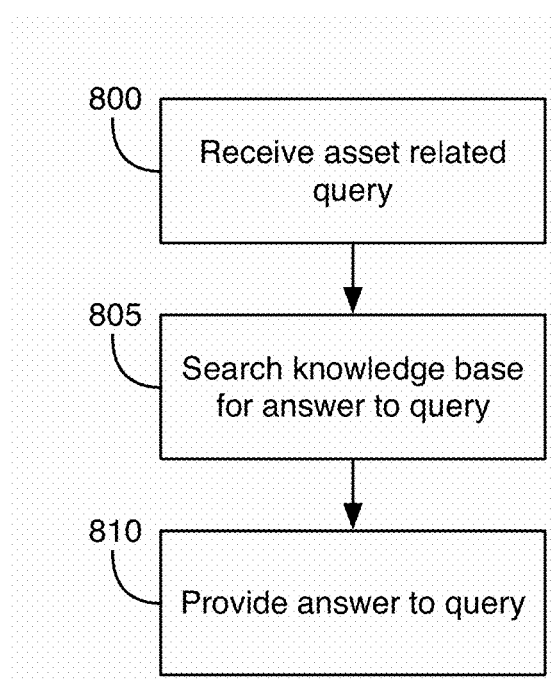
FIG. 8 illustrates operations performed by the PIPMS in answering a query related to assets identified in the knowledge base.

After a sufficiently large number of target PID's have been processed, the information in the knowledge base 212 may become sufficiently robust to facilitate providing, by the PIPMS 102, recommendations on how different types of assets should be connected. For example, a user interface may be generated that allows a facility operator to specify, via the facility operator terminal 106, the types of assets that need to be connected, along with parameters to be associated with the assets. For example, referring to FIG. 8, at operation 800, the PIPMS 102 may receive a query from the facility operator, via the user interface, such as "What type of pipe can be connected to the X2110 valve."

At operation 805, the PIPMS 102 may search the knowledge base 212 for assets that are valves named "X2110." The PIPMS 102 may then determine any assets that are pipes connected to the valve assert.

At operation 810, one or more suggested answers to the query may be communicated to the facility operator. Following the example above, the PIPMS 102 may provide a list of pipes that may be used with the X2110 valve.

The query may be more complicated. For example, the query may be "What type of pipe can be connected to the X2110 valve and that operates at 300° C. at 500 PSIa." In this case, the PIPMS 102 may first locate assets corresponding to the X2110 valve. The PIPMS 102 may then search for connected pipes specified to operate at 300° C. or higher and at 500 PSIa or higher.

In other implementations, the knowledge base 212 may be utilized to predict whether the arrangement of assets in a given target PID is correct. This information may be useful to, for example, a facility operator and may allow the operator to detect problems before they occur. For example, upon receiving an indication of a problem with a PID that describes an existing facility, the operator may halt production at the facility and change the problematic arrangement of equipment.

In some implementations, after detecting a problem with an existing facility, the PIPMS 102 may communicate instructions to potentially problematic equipment at the facility to operate in a way as to avoid the potential problem. For example, instructions to shut down the equipment, to lower the output pressure or flow of the equipment, etc. may be communicated to the equipment of the facility (108, FIG. 1) via the facility operator terminal 106. The equipment may in turn respond to the instruction thereby avoiding a potentially catastrophic failure of the facility.

In yet other implementations, information in the knowledge base may indicate a useful life of certain assets. In this case, the PIPMS 102 may determine that a given asset specified in a given PID is near end-of-life. The PIPMS 102 may automatically generate an order to an equipment manufacture for a replacement asset.

Figure 9:
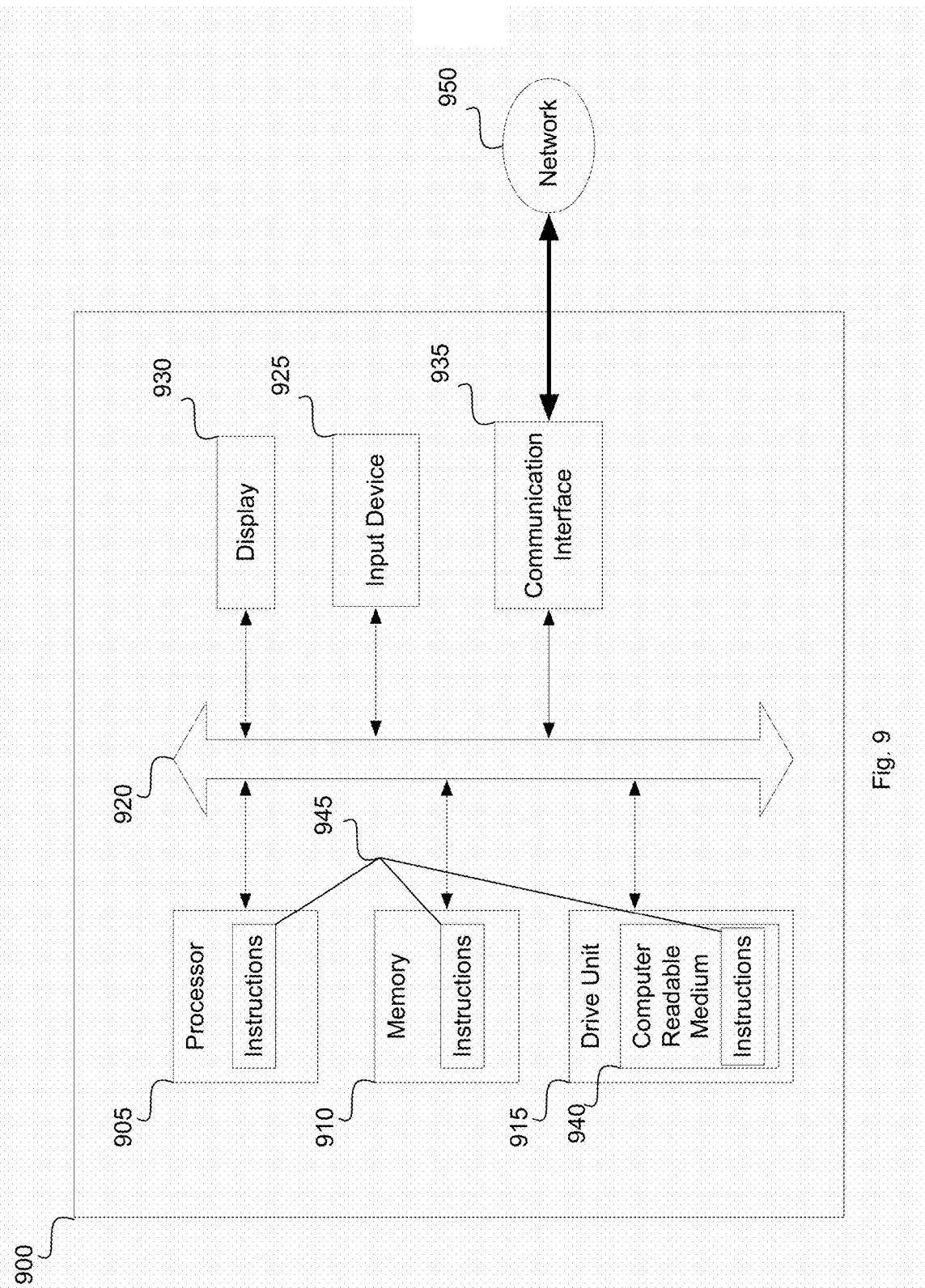
FIG. 9 illustrates an exemplary computer system that may form part of or implement the systems described in the figures or in the following paragraphs.

FIG. 9 illustrates a computer system 900 that may form part of or implement the systems, environments, devices, etc., described above. The computer system 900 may include a set of instructions 945 that the processor 905 may execute to cause the computer system 900 to perform any of the operations described above. The computer system 900 may operate as a stand-alone device or may be connected, e.g., using a network, to other computer systems or peripheral devices.

In a networked deployment, the computer system 900 may operate in the capacity of a server or as a client computer in a server-client network environment, or as a peer computer system in a peer-to-peer (or distributed) environment. The computer system 900 may also be implemented as or incorporated into various devices, such as a personal computer or a mobile device, capable of executing instructions 945 (sequential or otherwise) causing a device to perform one or more actions. Further, each of the systems described may include a collection of subsystems that individually or jointly execute a set, or multiple sets, of instructions to perform one or more computer operations.

The computer system 900 may include one or more memory devices 910 communicatively coupled to a bus 920 for communicating information. In addition, code operable to cause the computer system to perform operations described above may be stored in the memory 910. The memory 910 may be a random-access memory, read-only memory, programmable memory, hard disk drive or any other type of memory or storage device.

The computer system 900 may include a display 930, such as a liquid crystal display (LCD), a cathode ray tube (CRT), or any other display suitable for conveying information. The display 930 may act as an interface for the user to see processing results produced by processor 905.

Additionally, the computer system 900 may include an input device 925, such as a keyboard or mouse or touchscreen, configured to allow a user to interact with components of system 900.

The computer system 900 may also include a disk or optical drive unit 915. The drive unit 915 may include a computer-readable medium 940 in which the instructions 945 may be stored. The instructions 945 may reside completely, or at least partially, within the memory 910 and/or within the processor 905 during execution by the computer system 900. The memory 910 and the processor 905 also may include computer-readable media as discussed above.

The computer system 900 may include a communication interface 935 to support communications via a network 950. The network 950 may include wired networks, wireless networks, or combinations thereof. The communication interface 935 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A piping and instrumentation planning and maintenance system comprising:
   an input/output (I/O) interface for receiving a target piping and instrumentation diagram (PID) from a document source system;
   a processor in communication with the I/O interface; and
   non-transitory computer readable media in communication with the processor that stores instruction code, which when executed by the processor, causes the processor to:
   select, based on a type of the target PID, a process pipeline of a plurality of process pipelines for processing PIDs;
   classify, using the selected process pipeline, entities and properties thereof within the target PID, wherein the entities include one or more assets and interconnections therebetween specified in the PID;
   compare the classified entities to a knowledge base that represents relationships between a plurality of assets and interconnections between the plurality of assets;
   determine, based on the comparison, whether the one or more assets in the target PID are interconnected correctly; and
   when the one or more assets are not interconnected correctly, generate a report to identify the one or more assets that are not interconnected correctly.

2. The system according to claim 1, wherein the instruction code causes the processor to:
   process a plurality of PIDs through one or more models for identifying entities of each PID to thereby train the one or more models to identify the entities of each PID; and
   generate the knowledge base based on the entities identified in the plurality of PIDs.

3. The system according to claim 2, wherein the models include an asset detection model, an asset connection model, a pipe detection model, and a text tag detection model.

4. The system according to claim 2, wherein the instruction code causes the processor to:
   generate a user interface that depicts a classified representation of the target PID;
   receive alternative classifications for one or more of the entities of the classified representation to thereby update the classified representation of the target PID; and
   train the one or more models with the updated classified representation of the target PID.

5. The system according to claim 2, wherein the PIDs correspond to image documents and at least one model is limited to processing images smaller than the PIDs, wherein the instruction code causes the processor to:
   split each PID into smaller images capable of being processed by the at least one model;
   process the smaller images through the at least one model; and
   combine the results of the at least one model.

6. The system according to claim 1, wherein the knowledge base corresponds to an ontology and the ontology includes nodes that define documentation associated with assets.

7. The system according to claim 1, wherein the instruction code causes the processor to:
   receive, from a terminal, a query related to the selection and arrangement of assets;
   generate a response to the query based on information in the knowledge base; and
   communicate, to the terminal, the response to the query.

8. A method for planning and maintaining piping and instrumentation comprising:
   receiving a target piping and instrumentation diagram (PID) from a document source system;

selecting, based on a type of the target PID, a process pipeline of a plurality of process pipelines for processing PIDs;

classifying, using the selected process pipeline, entities and properties thereof within the target PID, wherein the entities include one or more assets and interconnections therebetween specified in the PID;

comparing the classified entities to a knowledge base that represents relationships between a plurality of assets and interconnections between the plurality of assets;

determining, based on the comparison, whether the one or more assets in the target PID are interconnected correctly; and when the one or more assets are not interconnected correctly, generating a report to identify the one or more assets that are not interconnected correctly.

9. The method according to claim 8, further comprising:
processing a plurality of PIDs through one or more models for identifying entities of each PID to thereby train the one or more models to identify the entities of each PID; and generating the knowledge base based on the entities identified in the plurality of PIDs.

10. The method according to claim 9, wherein the models include an asset detection model, an asset connection model, a pipe detection model, and a text tag detection model.

11. The method according to claim 9, further comprising:
generating a user interface that depicts a classified representation of the target PID;

receiving alternative classifications for one or more of the entities of the classified representation to thereby update the classified representation of the target PID; and training the one or more models with the updated classified representation of the target PID.

12. The method according to claim 9, wherein the PIDs correspond to image documents and at least one model is limited to processing images smaller than the PIDs, wherein the method further comprises:
splitting each PID into smaller images capable of being processed by the at least one model processing the smaller images through the at least one model; and combining the results of the at least one model.

13. The method according to claim 8, wherein the knowledge base corresponds to an ontology and the ontology includes nodes that define documentation associated with assets.

14. The method according to claim 8, further comprising:
receiving, from a terminal, a query related to the selection and arrangement of assets;

generating a response to the query based on information in the knowledge base; and communicating, to the terminal, the response to the query.

15. A non-transitory computer readable media that stores instruction code for planning and maintaining piping and instrumentation, the instruction code being executable by a machine for causing the machine to:

receive a target piping and instrumentation diagram (PID) from a document source system;

select, based on a type of the target PID, a process pipeline of a plurality of process pipelines for processing PIDs;

classify, using the selected process pipeline, entities and properties thereof within the target PID, wherein the entities include one or more assets and interconnections therebetween specified in the PID;

compare the classified entities to a knowledge base that represents relationships between a plurality of assets and interconnections between the plurality of assets;

determine, based on the comparison, whether the one or more assets in the target PID are interconnected correctly; and when the one or more assets are not interconnected correctly, generate a report to identify the one or more assets that are not interconnected correctly, wherein the report facilitates proactive replacement or rearrangement of assets in a facility associated with the target PID.

16. The non-transitory computer readable media according to claim 15, wherein the instruction code causes the machine to:
process a plurality of PIDs through one or more models for identifying entities of each PID to thereby train the one or more models to identify the entities of each PID; and generate the knowledge base based on the entities identified in the plurality of PIDs.

17. The non-transitory computer readable media according to claim 16, wherein the models include an asset detection model, an asset connection model, a pipe detection model, and a text tag detection model.

18. The non-transitory computer readable media according to claim 16, wherein the instruction code causes the machine to:
generate a user interface that depicts a classified representation of the target PID;

receive alternative classifications for one or more of the entities of the classified representation to thereby update the classified representation of the target PID; and train the one or more models with the updated classified representation of the target PID.

19. The non-transitory computer readable media according to claim 16, wherein the PIDs correspond to image documents and at least one model is limited to processing images smaller than the PIDs, wherein the instruction code causes the machine to:
split the PIDs into smaller images capable of being processed by the at least one model;

process the smaller images through the at least one model; and combine the results of the at least one model.

20. The non-transitory computer readable media according to claim 15, wherein the knowledge base corresponds to an ontology and the ontology includes nodes that define documentation associated with assets.

* * * * *